No. 655,919. Patented Aug. 14, 1900.
B. L. BEHRENDT & M. MAYER.
REVOLVING HAND FAN.
(Application filed Apr. 6, 1899.)
(No Model.)
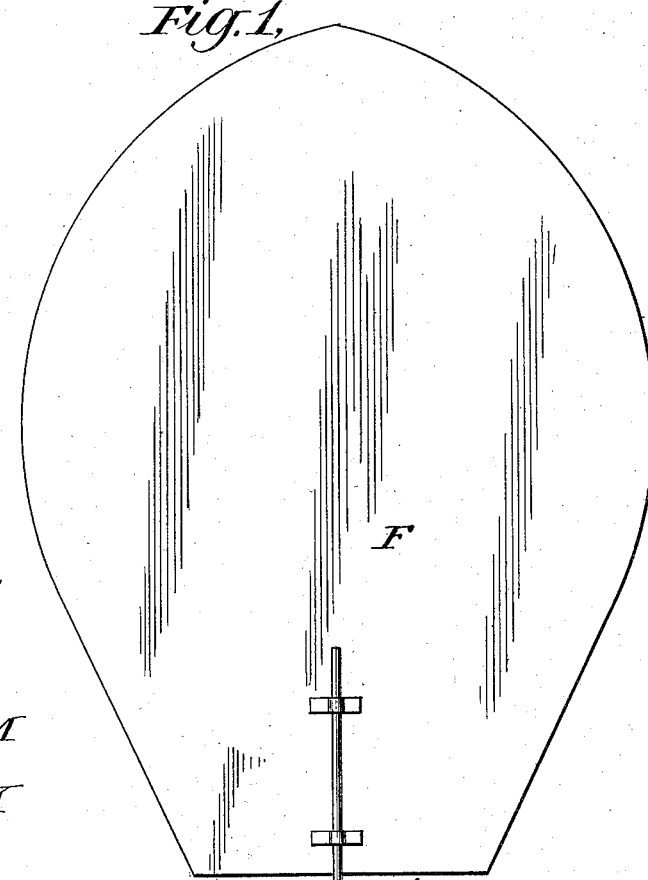
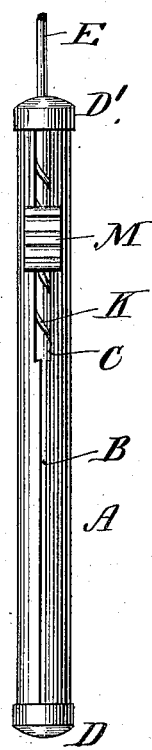
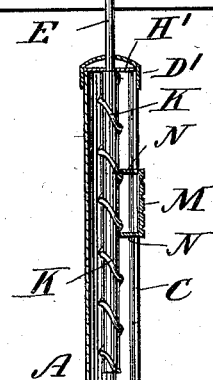
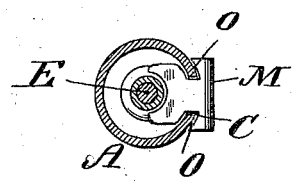
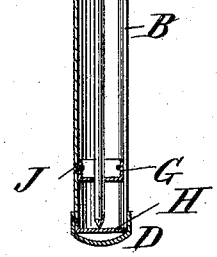
WITNESSES:
INVENTORS

UNITED STATES PATENT OFFICE.

BARNIM LOUIS BEHRENDT AND MAX MAYER, OF NEW YORK, N. Y.

REVOLVING HAND-FAN.

SPECIFICATION forming part of Letters Patent No. 655,919, dated August 14, 1900.

Application filed April 6, 1899. Serial No. 711,972. (No model.)

*To all whom it may concern:*

Be it known that we, BARNIM LOUIS BEHRENDT, a subject of the German Emperor, and MAX MAYER, a citizen of the United States, both residents of New York, in the county of New York and State of New York, have invented certain new and useful Improvements in Revolving Fans, of which the following is a specification.

Our invention relates to that class of revolving fans which are held in the hand and revolved by pressure of the thumb; and it consists in the particular construction, arrangement, and operation of the several parts, as hereinafter described, and pointed out in the claim, reference being had to the accompanying drawings, in which—

Figure 1 is a central longitudinal section of the handle and mechanism embodying our invention. Fig. 2 is a face view of the handle and thumb-piece, and Fig. 3 a cross-section through the handle.

Like letters of reference indicate like parts throughout the drawings.

A is a tubular handle which may be formed of thin sheet metal or any suitable material with an open seam or slot B extending preferably throughout its length and having a portion of the slot widened, as at C. We prefer to arrange over the ends caps or shells D D', through the latter of which extends a shaft E, to which the fan F is secured. The lower end of this shaft is journaled by a bearing in a shell G and by pressure of its end against a suitable hardened plate H, the shell G being fitted within the tubular handle and securely held in its position by friction and one or more indentations, as J, and the said plate being held in its position between the lower end of the said tubular handle and the cap K, exteriorly fitted over the lower end of the handle. The use of the interiorly-fitted shell serves also to expand the slotted handle outward against the inner walls of the exterior shell at the end and to strengthen this portion of the handle and aids also in securing the said parts in their positions. The other journal of the shaft is formed by a perforation in a suitable plate H', arranged at the upper end of the handle in similar manner to the plate H just described.

A worm-gear L is arranged upon the shaft and is arranged and adapted to be actuated by means of movement of the thumb-piece M. The construction of these parts we will now describe. The thumb-piece is formed flat in the direction of the length of the handle and with bent ends N N, each being provided with grooves O O, fitted to slide freely along the edges of the widened portion of the slot of the handle. These ends extend sufficiently within the handle and are so disposed with relation to the worm and the pitch of its teeth as to secure proper mesh therewith and to be adapted to properly actuate it in imparting a reciprocal rotary movement to the shaft E of the fan when the thumb-piece M is moved to and fro by the vertical and longitudinal pressure of thumb of the operator in both directions while holding the handle in a secure and easy grasp of the hand. It will be seen that this peculiar mechanism referred to possesses various advantages, particularly inasmuch as the extended ends of the said sliding thumb-piece alone serve to engage the worm and that, further, they are adapted to be readily adjusted to the pitch of the worm by a slight bending, as may be required; also, that by forming the grooves O O in the ends M M and in close proximity to their engaging portions with the worm, as shown, friction of these parts is practically reduced to a minimum. Lastly, it will be observed that longitudinal movement of the thumb with the handle is secured by this arrangement and that the operator has at all times during the operation substantially the same grasp of the handle and may conveniently at any point rest the thumb and cease operating the fan and without in any way changing the position of the hand and thumb instantly proceed to use the device as an ordinary fan.

By extending the slot or opening along the whole length of the handle and having only a portion thereof of sufficient width to receive the sliding thumb-piece, as above described, adjustability to the shell G and the cap D is secured, as also neatness in appearance of the device.

Having fully described our invention, what we claim as new, and desire to secure by Letters Patent, is—

The herein-described revolving fan comprising a vertically-disposed shaft, a fan secured to said shaft, a tubular handle having the shaft interiorly arranged, the lower end of said shaft having an endwise bearing against a solid plate and a lateral bearing in a perforated shell disposed within the said handle and above the said plate, a worm arranged upon the said shaft, a thumb-piece formed with two bent ends extending inwardly through a slot in said handle, grooves formed in both of said bent ends and fitting the inner edges of the slot in the handle and free to slide therein and be controlled in its direction of movement by its bearing within the said slot of the handle only, the said ends being in mesh with the worm of the shaft and adapted to be adjusted to proper mesh therewith, by bending either of the ends, said thumb-piece being also formed with a thumb-engaging surface flat in the direction of the length of the handle, whereby like pressure of the thumb may be exerted thereupon in either direction, and said shaft and fan being actuated thereby and independently of a spring: when all of said parts are arranged and operated as shown and described.

Signed at New York, in the county of New York and State of New York, this 1st day of April, A. D. 1899.

BARNIM LOUIS BEHRENDT.
MAX MAYER.

Witnesses:
J. CHAS. MESCHLER,
ANNIE DONEGAN.